(12) United States Patent
Miyahara

(10) Patent No.: US 7,458,565 B2
(45) Date of Patent: Dec. 2, 2008

(54) VIBRATION-PROOF APPARATUS FOR VEHICLE

(75) Inventor: Tetsuya Miyahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 11/267,024

(22) Filed: Nov. 4, 2005

(65) Prior Publication Data

US 2006/0091594 A1    May 4, 2006

(30) Foreign Application Priority Data

Nov. 4, 2004    (JP) .......................... P2004-321297

(51) Int. Cl.
| | |
|---|---|
| F16F 5/00 | (2006.01) |
| F16F 9/00 | (2006.01) |
| F16F 13/00 | (2006.01) |
| F16F 15/00 | (2006.01) |
| F16M 5/00 | (2006.01) |
| F16M 7/00 | (2006.01) |
| F16M 9/00 | (2006.01) |
| F16M 11/00 | (2006.01) |

(52) U.S. Cl. ........................... 267/140.11; 267/140.13; 267/140.4; 267/141; 248/636

(58) Field of Classification Search ............ 267/140.11, 267/140.13, 141, 140.4, 140; 248/636, 638
See application file for complete search history.

(56) References Cited

U.S. PATENT DOCUMENTS

| | | | | |
|---|---|---|---|---|
| 1,880,181 | A | * | 9/1932 | Turner ......................... 248/599 |
| 1,937,581 | A | * | 12/1933 | Lord ........................... 248/612 |
| 2,389,562 | A | * | 11/1945 | Storch ......................... 248/613 |
| 4,629,154 | A | * | 12/1986 | Kataczynski ................. 248/610 |
| 4,632,372 | A | * | 12/1986 | Nakajima et al. ......... 267/140.11 |
| 4,687,188 | A | * | 8/1987 | Knurek et al. ......... 267/140.13 |
| 4,762,309 | A | * | 8/1988 | Hutchins ................ 267/140.13 |
| 4,826,126 | A | * | 5/1989 | Katayama et al. ........... 248/562 |
| 4,880,215 | A | * | 11/1989 | Katayama et al. ...... 267/140.13 |
| 4,896,867 | A | * | 1/1990 | Schyboll et al. ........ 267/140.13 |
| 4,901,986 | A | * | 2/1990 | Smith .................... 267/140.14 |
| 4,921,201 | A | * | 5/1990 | Jouade .................. 267/140.13 |
| 5,024,461 | A | * | 6/1991 | Miyakawa et al. ..... 267/140.13 |

(Continued)

FOREIGN PATENT DOCUMENTS

DE    3712656    11/1987

(Continued)

Primary Examiner—Robert A Siconolfi
Assistant Examiner—Thomas W Irvin
(74) Attorney, Agent, or Firm—Carrier, Blackman & Associates, P.C.; Joseph P. Carrier; William D. Blackman

(57) ABSTRACT

A vehicle vibration-proof apparatus for supporting an engine and preventing transmission of vibrations from the engine includes an elastic member for connecting a first mounting member to be mounted to an engine with a second mounting member to be mounted to a vehicle body. The second mounting member includes a resinous bracket, having a tubular part and mounting parts for being mounted to the vehicle body, and a metal reinforcing bracket to be mounted to the tubular part for reinforcing the tubular part. The tubular part has a part, which is not reinforced longitudinally, between the mounting parts and a part thereof to which the metal reinforcing member is mounted.

20 Claims, 7 Drawing Sheets

U.S. PATENT DOCUMENTS

| | | | |
|---|---|---|---|
| 5,242,158 A * | 9/1993 | Robic et al. | 267/140.14 |
| 5,273,262 A * | 12/1993 | Baldini et al. | 267/140.13 |
| 5,295,672 A * | 3/1994 | Gugsch | 267/140.13 |
| 5,318,283 A * | 6/1994 | Weltin et al. | 267/140.14 |
| 5,340,093 A * | 8/1994 | Rudolph | 267/219 |
| 5,398,907 A * | 3/1995 | Kelchner | 248/634 |
| 5,700,000 A * | 12/1997 | Wolf et al. | 267/140.13 |
| 5,704,598 A * | 1/1998 | Kojima | 267/140.13 |
| 5,707,047 A * | 1/1998 | Meyering et al. | 267/140.13 |
| 5,927,698 A * | 7/1999 | Miyoshi et al. | 267/140.13 |
| 5,947,455 A * | 9/1999 | Mikasa et al. | 267/140.13 |
| 5,988,611 A * | 11/1999 | Takashima et al. | 267/140.13 |
| 6,036,183 A * | 3/2000 | Lee et al. | 267/140.14 |
| 6,120,011 A * | 9/2000 | Maeno et al. | 267/140.11 |
| 6,131,894 A * | 10/2000 | Satori et al. | 267/140.13 |
| 6,371,462 B2 * | 4/2002 | Gennesseaux | 267/140.13 |
| 6,523,816 B1 * | 2/2003 | Gastineau et al. | 267/140.14 |
| 6,536,113 B2 * | 3/2003 | Guillemot | 29/896.93 |
| 6,592,110 B2 * | 7/2003 | Takashima et al. | 267/140.13 |
| 6,962,229 B2 * | 11/2005 | Miyahara | 180/291 |
| 7,188,828 B2 * | 3/2007 | Rudolf et al. | 267/140.13 |

FOREIGN PATENT DOCUMENTS

| | | | |
|---|---|---|---|
| DE | 3712656 A1 * | 11/1987 | |
| JP | 6-185558 | * | 7/1994 |
| JP | 09-079311 | * | 3/1997 |
| JP | 09-177866 | | 7/1997 |
| JP | 09-177867 | | 7/1997 |
| JP | 10-047424 | | 2/1998 |
| JP | 2001-050331 | | 2/2001 |

* cited by examiner

VIBRATION-PROOF APPARATUS FOR VEHICLE

FIELD OF THE INVENTION

The present invention relates to a vibration-proof apparatus for mounting a power source to a vehicle body and preventing transmission of vibrations produced by the power source to the vehicle body.

BACKGROUND OF THE INVENTION

Various types of vibration-proof apparatuses are known from, for example, JP-A-9-177866 and JP-A-2001-50331.

Each of such conventional apparatuses comprise a first mounting member to be mounted to an engine serving as a power source, a second mounting member to be mounted to a vehicle body, and an elastic member made of rubber, etc. for connecting the first and second mounting members.

The second mounting member is comprised of a resinous bracket which is formed of a tubular part to be bonded with an outer peripheral surface of the elastic member, and a flange projecting radially outwardly from a lower end of the tubular part. The vibration-proof apparatus is secured to the vehicle body by bolting the flange to the vehicle body.

More specifically, on an inner surface of the tubular part of the tubular-shaped resinous bracket to which the elastic member is mounted, a metal tubular part is formed by insert molding. The metal tubular part is disposed along the entire axial length of the resinous bracket. In this manner, a dual-structured support bracket is provided by the resinous bracket positioned outside and the metal tubular part positioned inside.

The vibration-proof apparatus is of a hydro type and also includes a fluid chamber defined by the elastic member and a diaphragm mounted to the metal tubular part, which is divided by a partition member into a main fluid chamber and a sub fluid chamber communicating with the main chamber via an orifice. A working fluid circulates through the main and sub fluid chambers via the orifice to thereby attenuate engine vibrations.

When a vehicle encounters a collision, the resultant collision energy also acts on the vehicle vibration-proof apparatus positioned between a vehicle body part deformed by the collision energy and the engine. Eventually, the collision energy acts on the resinous bracket in its entirety from the vehicle body through the flange.

However, since it is internally provided with the metal tubular part, the resinous bracket has strength of relatively large magnitude. Thus, as it is viewed from the standpoint of collision energy absorption, the bracket may often act as a rigid body. Accordingly, there is a demand for improved energy absorbing capacity of the vehicle vibration-proof apparatus.

For improving the collision energy absorbing capability of the resinous bracket, one may propose to provide notches circumferentially on the outer peripheral surface of the tubular part of the resinous bracket, so that the notches deform or become destroyed by a collision energy to thereby absorb the collision energy.

However, the resinous bracket provided with such notches has room for further improvement in that it cannot sufficiently bear a load acting axially on the tubular part of the apparatus.

Consequently, there exists a demand for improvement in the vehicle vibration-proof apparatus so that the apparatus can sufficiently bear a load applied axially thereto and absorb a collision energy (load) acting thereon from a direction normal to the axis of the apparatus.

SUMMARY OF THE INVENTION

According to the present invention, there is provided a vehicular vibration-proof apparatus which comprises: a first mounting member adapted to be mounted to one of a power source and a vehicle body; a tubular-shaped second mounting member adapted to be mounted to the other of the power source and the vehicle body; and an elastic member connecting the first mounting member with the second mounting member, the second mounting member comprising a resinous bracket and a metal reinforcing member, the resinous bracket having a tubular part within which the elastic member is mounted, and mounting parts extending from the tubular part outwardly in a direction normal to an axis of the tubular part and adapted to be mounted to the other of the power source and the vehicle body, the tubular part and the mounting parts being formed integrally with the resinous bracket, the metal reinforcing member being oriented in an axial direction of the tubular part and mounted to the tubular part at a position displaced in the axial direction from the mounting parts for reinforcing the tubular part.

Desirably, an end of the metal reinforcing member is mounted to an end of the tubular part which is remote from the mounting parts, for reinforcing that part of the tubular part to which the metal reinforcing member end is mounted, whilst another part of the tubular part, positioned between the reinforced part and the mounting parts, is not reinforced.

In the thus-arranged vibration-proof apparatus, the tubular part has a part which is not axially reinforced by the metal reinforcing member. The non-reinforced part has small strength. There is a big difference in strength between the reinforced part and the non-reinforced part. The non-reinforced part serves as a weak part which easily deforms or becomes destroyed when a load larger than a predetermined magnitude is applied to the vibration-proof apparatus in a direction normal to its axial direction. That is, the non-reinforced part serves as a starting point of destruction. This improves energy absorbing capability of the vibration-proof apparatus significantly.

In addition, the non-reinforced part also aids in supporting the apparatus against a load coming from an axial direction. Consequently, the apparatus can fully play its role as a vehicle vibration-proof apparatus.

As is clear from the foregoing discussion, the vehicle vibration-proof apparatus according to this invention can sufficiently bear a load applied axially thereto and absorb collision energy acting thereon from a direction normal to its axis with increased efficiency.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENTS

Figure 1:
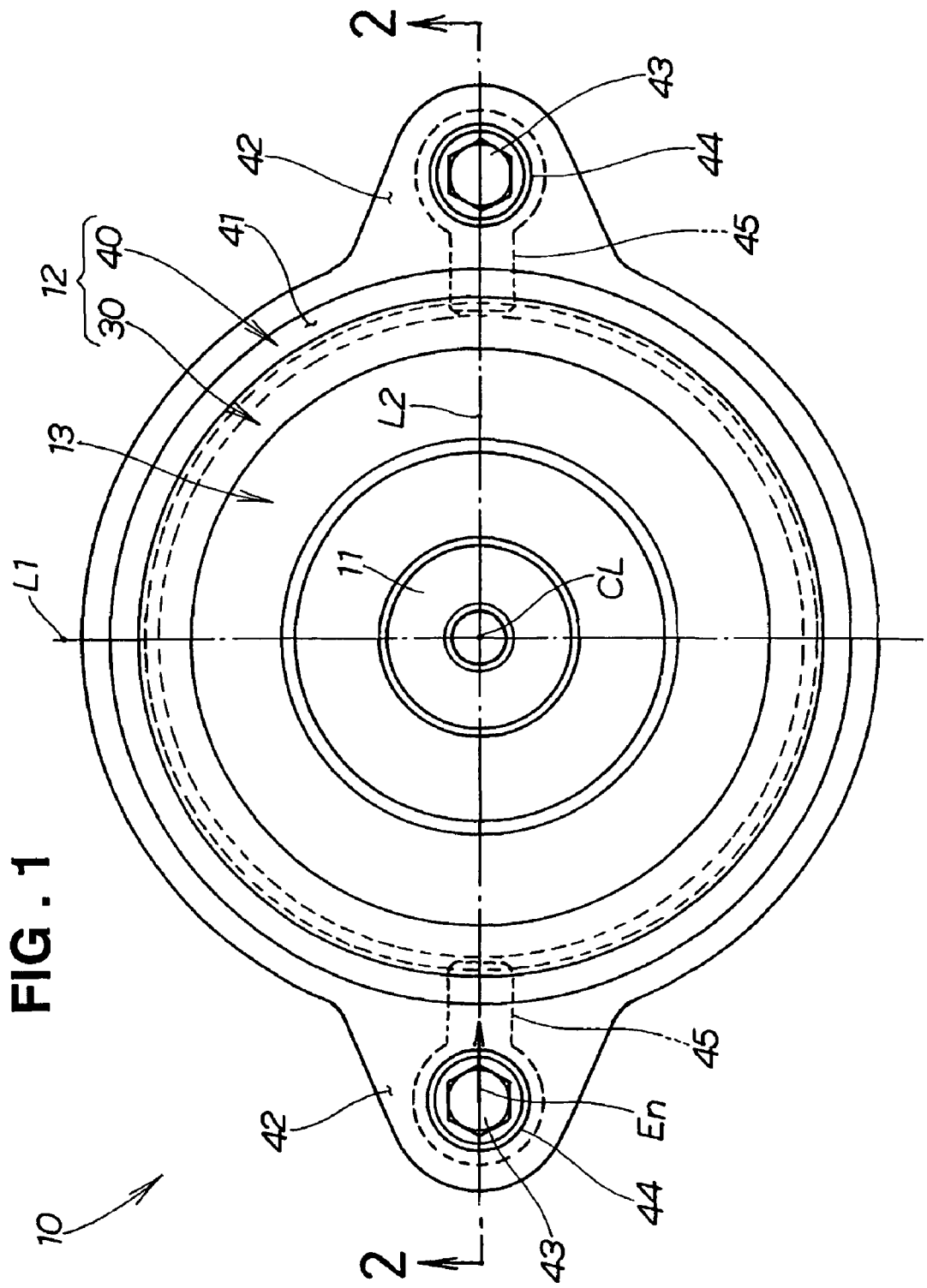
FIG. 1 is a top plan view illustrating a vehicular vibration-proof apparatus according to the present invention.
Figure 2:
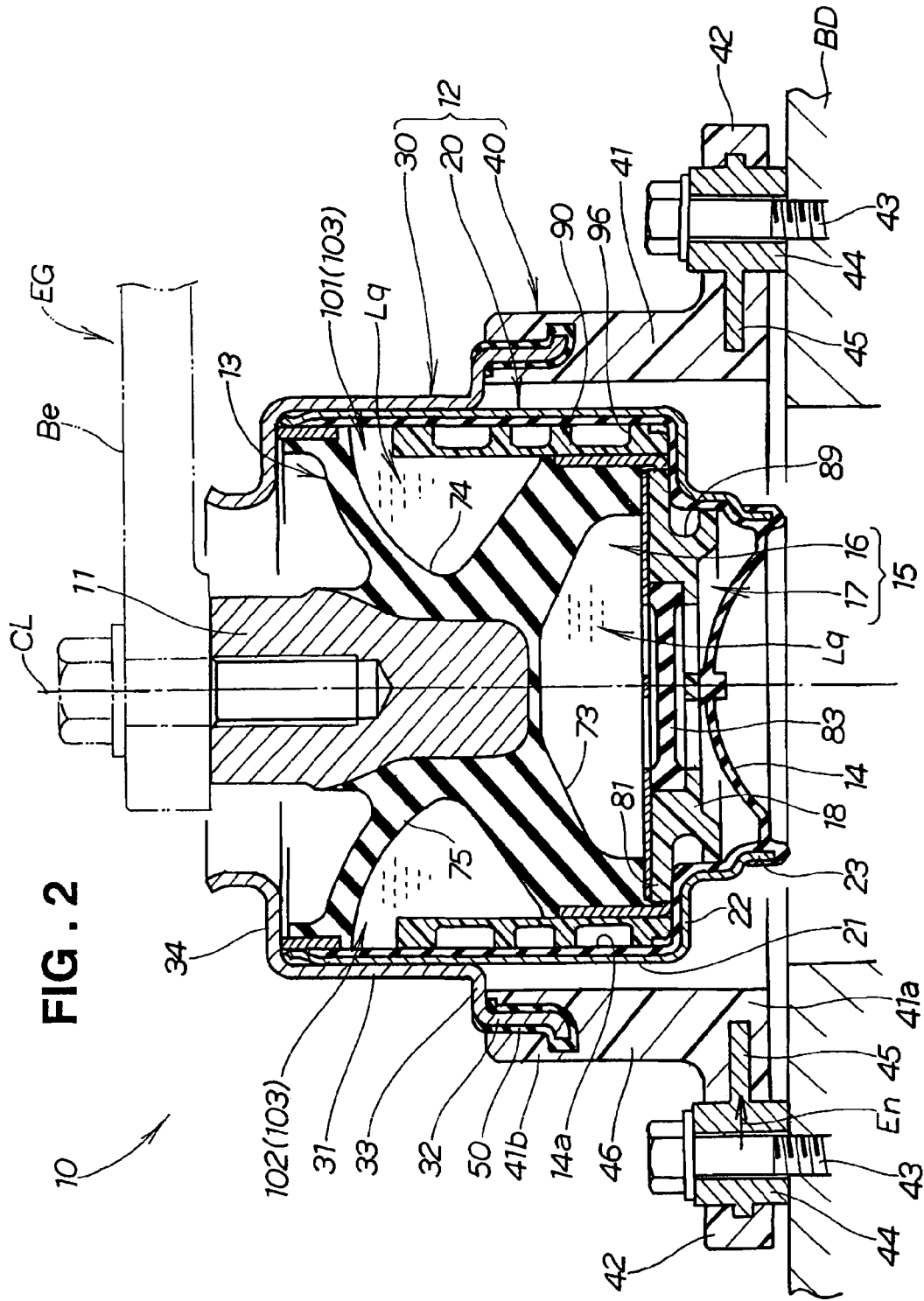
FIG. 2 is a cross-sectional view taken along line 2-2 of FIG. 1.

Referring to FIGS. 1 and 2, a vehicular vibration-proof apparatus 10 is a vibration-proof mechanism which is disposed between a vehicle body BD and an engine (power source) EG, supports the engine while preventing vibrations of the engine and functions as a hydro-mount.

As shown in FIG. 2, the vibration-proof apparatus 10 comprises a first mounting member 11 for mounting the apparatus 10 to the engine EG, a second mounting member 12 in the form of a tube for mounting the apparatus 10 to the vehicle body BD as a support member, an elastic member 13 for connecting the first and second mounting members 11, 12 together, a diaphragm 14 secured to the second mounting member 12 remotely from the elastic member 13, a first fluid chamber 15 defined at least by the elastic member 13 and the diaphragm 14, and a partition member 18 secured to the second mounting member 12 for dividing the first fluid chamber 15 into a main fluid chamber 16 on the side of the elastic member 13 and a sub fluid chamber 17 on the side of the diaphragm 14.

The first and second mounting members 11, 12, elastic member 13, diaphragm 14, first fluid chamber 15 and partition member 18 are arranged on a vertical axis or centerline CL of the vibration-proof apparatus 10. The main fluid chamber 16 and the sub fluid chamber 17 are closed spaces for holding a working fluid in a sealed fashion.

The first mounting member 11 comprises a metal member to be mounted to the engine EG via an engine bracket Be.

The second mounting member 12 comprises a metal tubular member 20 connected with the elastic member 13, a metal bracket 30 in which the metal tubular member 20 is press-fitted, and a resinous bracket 40 designed to support the metal bracket 30 and to be secured to the vehicle body BD.

The elastic member 13 comprises a rubber block which can elastically deform to absorb vibrations transmitted between the first and second mounting members 11, 12.

Describing the second mounting member 12, the metal tubular member 20 is a tubular-shaped member made of, e.g., steel or an aluminum alloy. Details of the metal tubular member 20 will be described later.

Figure 3:
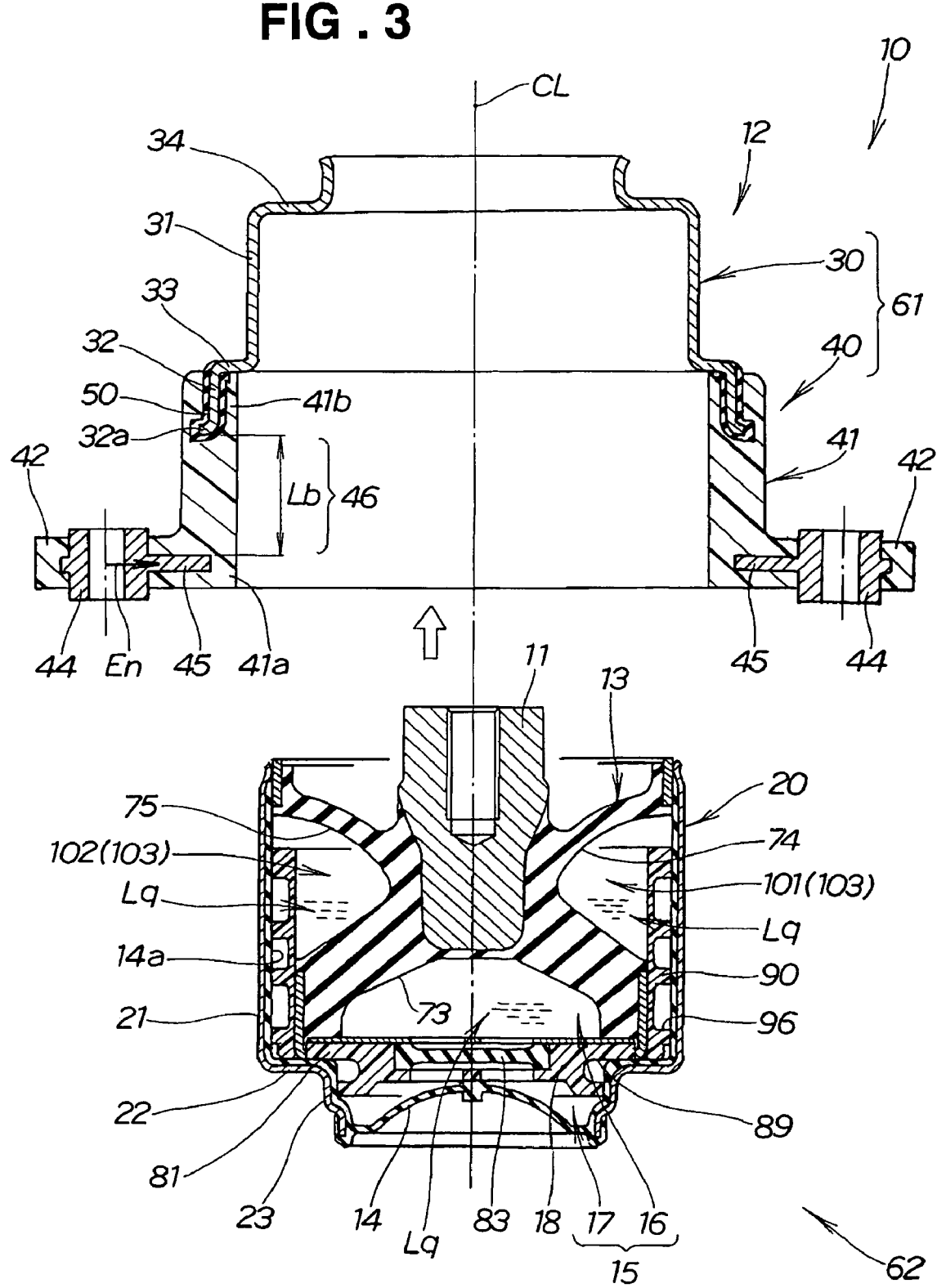
FIG. 3 is an exploded view showing the vibration-proof apparatus shown in FIG. 2.

As shown in FIG. 1 to FIG. 3, the resinous bracket 40 is an integrally formed member comprised of a tubular part 41 and a pair of right and left mounting parts 42, 42 extending radially outwardly from a lower end 41a of the tubular part 41. The elastic member 13 is attached to the tubular part 41 via the metal bracket 30 and the metal tubular member 20.

Each mounting part 42 comprises a generally horizontal plate secured to the vehicle body BD via bolts 43, 43. Each mounting part 42 has a metal collar 44 with a metal brim part 45 extending toward the centerline CL. The collar 44 has a hole for allowing passage of one of the bolts 43, 43. The collar 44 and the brim part 45 are made of steel, an aluminum alloy or castings of these material.

The collar 44 is in the form of a tube projecting slightly from front and rear surfaces of the mounting part 42 and prevents buckling of the mounting part 42 upon mounting of the same to the vehicle body BD by tightening the bolt 43.

The brim part 45 is in the form of a plate integrally formed with the collar 44 at midway of its height and extending generally parallel to a lower surface of the mounting part 42. More specifically, the brim part 45 extends half the thickness of the tubular part 41 toward the centerline CL.

As shown in FIG. 2 and FIG. 3, the metal bracket 30 is a tubular member made of steel or an aluminum alloy, for example. The metal bracket 30 is an integrally formed member comprising a tubular press-fitting part 31 into which the metal tubular member 20 is press-fitted, a non-press-fitting part 32 into which the metal tubular member 20 is not press-fitted, a connecting part 33 connecting the fitting part 31 and the non-press-fitting part 32, and a stop part 34 for stopping press-fitting of the metal tubular member 20. The metal bracket 30 may be press-formed from, for example, a sheet material or a pipe material of given thickness and elastically deforms radially slightly.

The stop part 34, press-fitting part 31, connecting part 33 and non-press-fitting part 32 are arranged along the centerline CL from the engine side toward the vehicle body side.

The non-press-fitting part 32 has a diameter larger than a diameter of the press-fitting part 31. The non-press-fitting part 32 is continuous with the press-fitting part 31 through the connecting part 33 which forms an annular stepped part between the press-fitting part 31 and the non-press-fitting part 32.

The non-press-fitting part 32 is covered all around (outer and inner surfaces) with a rubber member (cushioning member) 50 of a given thickness. The rubber member 50 is fixedly secured to the non-press-fitting part 32 by integral forming or baking. The non-press-fitting part 32 is embedded, together with the rubber member 50, in an upper end 41b of the tubular part 41 of the resinous bracket 40.

Of the metal bracket 30, the press-fitting part 31 and the connecting part 33 are exposed from an upper end of the resinous bracket 40 toward the engine EG side.

The non-press-fitting part 32 also has a projection 32a provided at an end (lower end) opposite or remote from the connecting part 33 and projecting radially outwardly. The projection 32a is also embedded in the tubular part 41 so as to prevent the metal bracket 30 from coming out of the resinous bracket 40.

As is clear from the above discussion, assemblage of the metal bracket 30 with the resinous bracket 40, as shown in FIG. 3, provides a partial assembly 61 (hereinafter referred to as a first partial assembly 61).

The stop part 34 comprises a constricted part at a distal end of the press-fitting part 31.

As shown in FIG. 3, because the non-press-fitting part 32 is embedded in the upper end 41b of the tubular part 41, the metal bracket 30 also functions as a reinforcing member for reinforcing the tubular part 41. Namely, for reinforcing the tubular part 41, the metal bracket 30 as the metal reinforcing member is provided at a position a distance Lb away from the mounting parts 42, 42 axially of the tubular part 41 (direction parallel to the centerline CL).

More specifically, the brim part 45 extends toward the centerline CL as far as a position below the non-press-fitting part 32. As a result, the tubular part 41 is provided with a non-reinforced part 46 of a distance or range Lb running from an upper surface of the brim part 45 to a lower end of the non-press-fitting part 32. The non-reinforced part 46 is not reinforced by any of the non-press-fitting part 32, the collar 44 and the brim part 45.

As is apparent from the foregoing description, that part of the tubular part 41 of the resinous bracket 40 which is reinforced by the metal bracket 30 as the metal reinforcing member, i.e., the upper end 41b, has large strength.

On the other hand, because the metal bracket 30 is spaced the distance Lb axially upwardly away from the mounting parts 42, 42 extending radially outwardly from the lower end 41a of the tubular part 41, a part which is not reinforced by the metal bracket 30, that is, the non-reinforced part 46, is provided between the tubular part 41 and the mounting parts 42, 42. The non-reinforced part has small strength.

There is a large difference in strength between the part 41b reinforced by the metal bracket 30 and the part 46 non-reinforced by the metal bracket 30. When collision energy En (collision load) larger than a predetermined magnitude is applied from a direction perpendicular to the axis or centerline CL of the vibration-proof apparatus 10, the non-reinforced part 46 acts as a weakened part that deforms or becomes destroyed by a stress concentrating thereon. In other words, the non-reinforced part 46 acts as a point for initiating self-destruction.

When collision energy En heading for the centerline CL is applied to the vehicle body BD as shown in FIGS. 1 and 2, for example, the energy En is transmitted from the vehicle body BD to the brim part 45 through the bolt 43 and the collar 44. A distal end of the brim part 45 extends into the tubular part 41. The collision energy En is transmitted from the distal end of the brim part 45 to the non-reinforced part 46. As a result, the relatively weak non-reinforced part 46 acts as the point of self-destruction and starts deforming to thereby absorb the collision energy En.

Because it extends toward the centerline CL, the collision energy En is directed by the brim part 45 to the centerline CL. By this arrangement, the collision energy En is surely directed to the tubular part 41 so that the stress will concentrate on the non-reinforced part 46.

As described above, when the collision energy En is applied to the vehicle vibration-proof apparatus 10 from the direction perpendicular to the centerline CL, the non-reinforced part 46 easily deforms or becomes destroyed. Consequently, the vibration-proof apparatus 10 is imparted with improved capability to absorb the collision energy En. Further, the non-reinforced part 46 assists in supporting the apparatus 10 against a load applied axially of the apparatus 10 to thereby make the apparatus fully function.

As discussed above, the vehicle vibration-proof apparatus 10 can sufficiently bear a load applied axially thereto from the engine EG and absorb vibrations of the engine EG sufficiently. Further, the apparatus 10 is rendered capable of absorbing collision energy En applied thereto from a direction perpendicular to the axis thereof.

Figure 4:
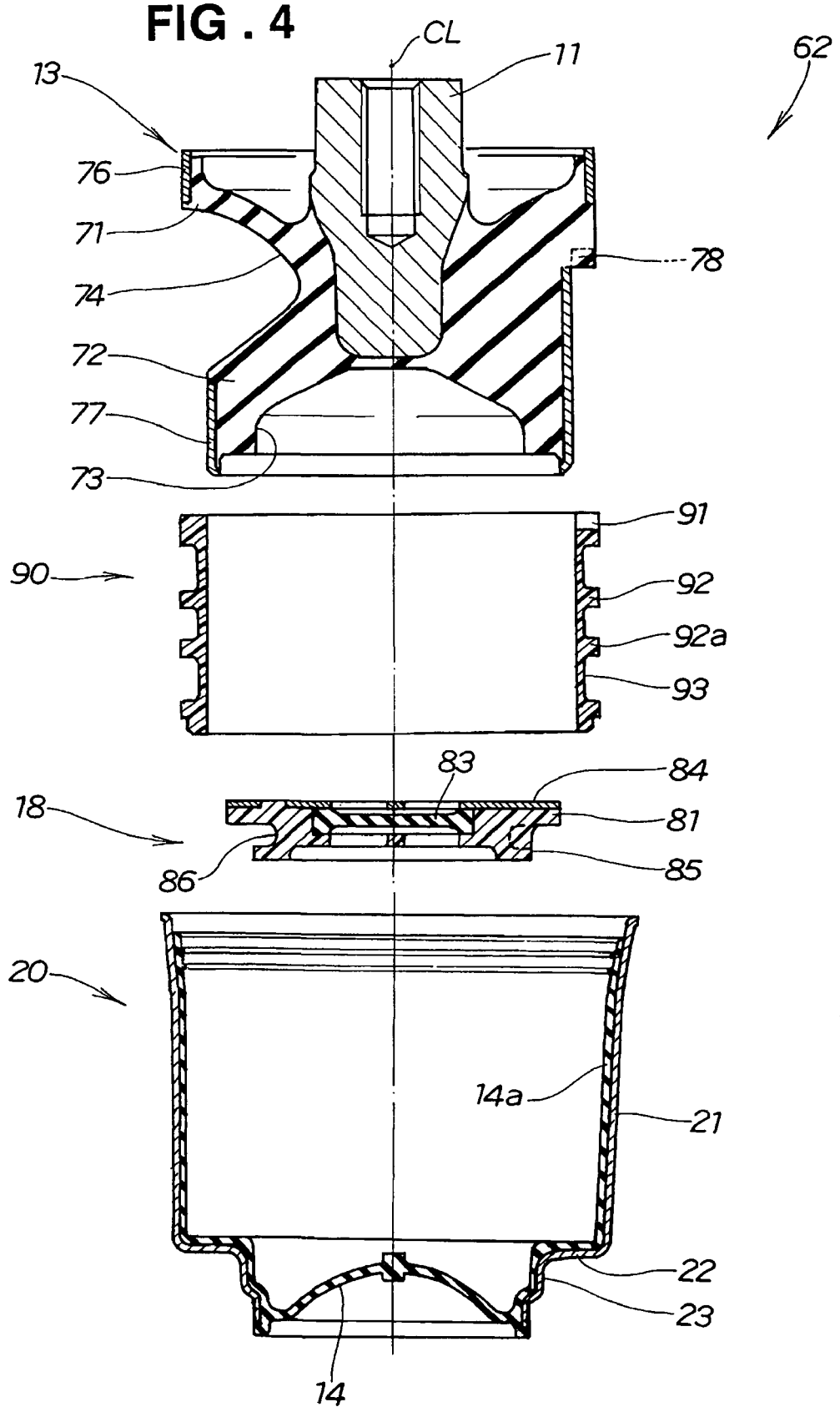
FIG. 4 is a further exploded view illustrating an elastic member, a diaphragm, a partition member and a metal tubular member shown in FIG. 3.

Reference is now made to FIG. 4 illustrating in exploded view the elastic member 13, the diaphragm 14, the partition member 18 and the metal tubular member 20.

As shown in FIG. 3 and FIG. 4, the metal tubular member 20 is an integrally formed member comprising the first cylindrical part 21 having an enlarged diameter, an annular plate part 22 continuing from one end of the first cylindrical part 21, and the second cylindrical part 23 continuing from the annular plate part 22 and having a reduced diameter. The metal tubular member 20 may be press-formed from a plate or pipe material, for example.

The elastic member 13 is designed to be accommodated in the first cylindrical part 21, which in turn is to be press-fitted in the press-fitting part 31 of the metal bracket 30. The diaphragm 14 and the partition member 18 are to be secured to the second cylindrical part 23.

The diaphragm 14 is designed to close a lower opening (provided on a vehicle body side, as shown in FIG. 2) and is made of an elastic material such as a film-shaped rubber material and bent convexly toward the partition member 18. Consequently, the diaphragm 14 is displaceable axially of the vibration-proof apparatus 10.

Further, with its outer periphery, the diaphragm 14 covers a lower part of an inner peripheral surface of the second cylindrical part 23 and has a covering film part 14a for covering the whole of the inner peripheral surface of the metal tubular member 20. The covering film part 14a comprises a thin film of a given thickness and is fixedly secured to the metal tubular member 20 by baking and/or other means of attachment.

After the partition member 18, a side partition member 90, discussed later, and the elastic member 13 are assembled to or fitted within the metal tubular member 20 having the diaphragm 14 in the order in which they are mentioned, an upper end of the first cylindrical part 21 is folded radially inwardly to thereby provide a partial assembly 62 (hereinafter referred to as a second partial assembly 62).

The first cylindrical part 21 of the second partial assembly 62 is press-fitted into the press-fitting part 31 of the metal bracket 30, as shown in FIG. 2, until it comes into abutment against the stop part 34 to assemble the second partial assembly having the elastic member 13, with the resinous bracket 40 to thereby complete assemblage of the vehicle vibration-proof apparatus 10.

That part of the first cylindrical part 21 which remains after engagement of the cylindrical part 21 in the press-fitting part 31 is positioned within the resinous bracket 40. The lower end of the metal tubular member 20 is positioned at generally the same height as a mounting surface of the mounting part 42. As a result, the non-press-fitting part 32, as shown in FIG. 2, is oriented in the direction of the axis or centerline CL of the tubular member 20 and is spaced a predetermined distance radially outwardly from the tubular member 20. That is, the lower half of the metal tubular member 20 and the inner peripheral surface of he non-press-fitting part 32 are spaced a predetermined distance from each other.

By virtue of that part of the second mounting member 12 which is to be mounted to the vehicle body BD and or the engine EG is formed by the resinous bracket 40, it becomes possible to reduce the weight of the vehicle vibration-proof apparatus 10.

As shown in FIG. 3, the non-press-fitting part 32 of the metal bracket 30 is embedded in the resinous bracket 40 via the rubber member 50. When the metal tubular member 20 with the elastic member 13 mounted thereto is press-fitted into the press-fitting part 31 of the metal bracket 30, a force acting radially outwardly on the press-fitting part 31 is dampened by the non-press-fitting part 32 and the rubber member 50, thus reducing the force acting on the resinous bracket 40 during the press-fitting operation. Consequently, the resinous bracket 40 is sufficiently protected from the acting force applied upon press-fitting of the metal tubular member 20 into the press-fitting part 31.

Moreover, the acting force arising upon press-fitting of the metal tubular member 20 into the press-fitting part 31 may be set at an appropriate value. This makes the assembling process of press-fitting the second partial assembly 62 into the first partial assembly 61 to be secured to the vehicle body BD or the engine EG, as shown in FIG. 2, go smoothly.

As shown in FIG. 2, the non-press-fitting part 32 is provided coaxially with the metal tubular member 20 in radially outwardly spaced relation to the latter and is continuous with the press-fitting part 31 via the stepped connecting part 33. Thus, force acting radially on the press-fitting part 31 is dampened not only by the non-press-fitting part 32 and the rubber member 50 but also by the stepped connecting part 33. Consequently, an external force acting on the resinous bracket 40 during its press-fitting assembling is further reduced or weakened, thereby protecting the resinous bracket 40 from the radial force applied upon its press-fitting.

Discussion will be made next as to the elastic member 13, the partition member 18 and the side partition member 90.

Figure 5A:
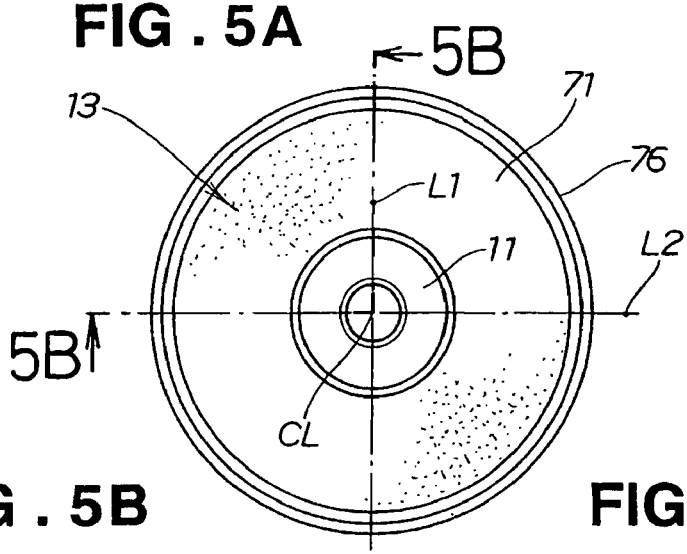
FIG. 5A to FIG. 5D illustrate details of the elastic member shown in FIG. 4.
Figure 5B:
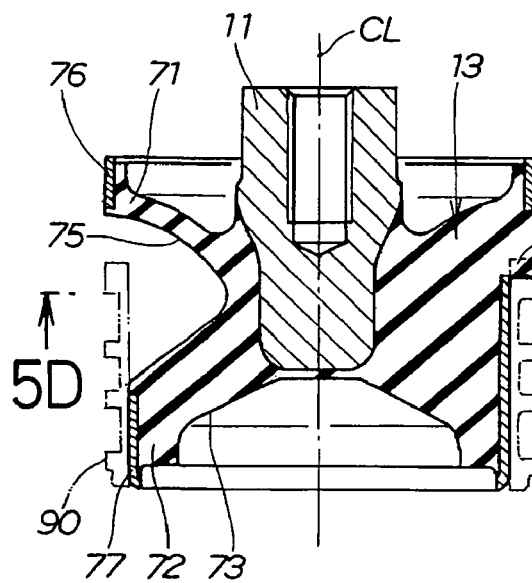
Figure 5C:
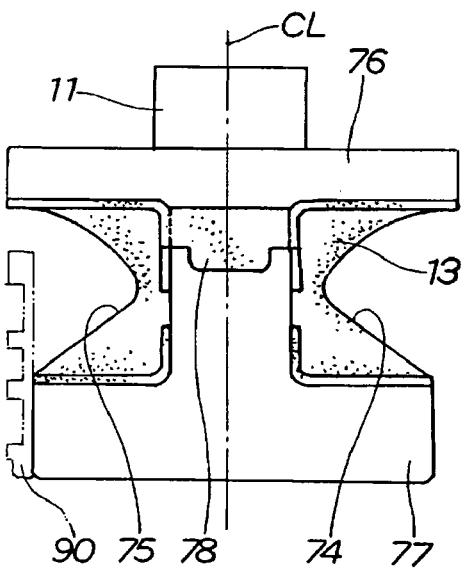
Figure 5D:
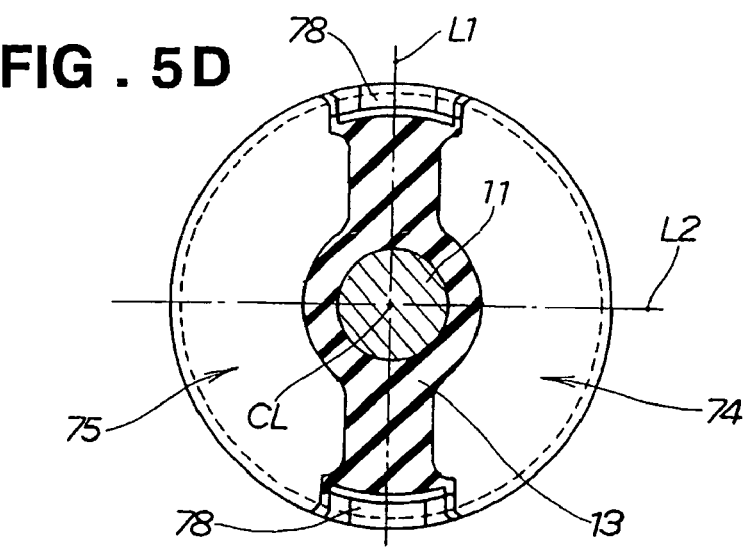

FIG. 5A to FIG. 5D illustrate an arrangement of the elastic member 13 of FIG. 4. Shown in FIG. 5A is a top surface of the elastic member 13; FIG. 5B is a cross-sectional view taken along line 5B-5B of FIG. 5A while FIG. 5C shows the elastic member 13 as viewed in the direction of arrow 5C of FIG. 5A. FIG. 5D is a cross-sectional view taken along line 5D-5D of FIG. 5B.

The elastic member 13 has a generally columnar shape defined by an upper end 71 and a lower end 72 and is comprised of a lower hollow part 73 opened downwardly from the lower end 72, and a pair of front and rear or right and left side hollow parts (first side hollow part 74 and second side hollow part 75) largely opening radially outwardly from the side thereof.

In a columnar part positioned centrally of the elastic member 13, the first mounting part 11 is embedded such that it projects upwardly from the upper end 71, as shown in FIG. 5B.

As shown in FIG. 5A and FIG. 5D, as the elastic member 13 is viewed from above and below, the first and second side hollow parts 74, 75 are formed symmetrically with respect to a first line L1 passing over the axis CL of the elastic member 13 and perpendicularly intersecting a second line L2 also passing over the elastic member axis CL. The upper end 71 of the upper half of the elastic member 13 has a diameter larger than a diameter of the lower end of the lower half of the elastic member 13. An outer peripheral surface of the upper end 71 is covered by an upper mandrel 76 while an outer peripheral surface of the lower end 72 is covered by a lower mandrel 77. Provided at a stepped part between the upper end 71 and the lower end 72 is a pair of positioning protrusions 78, 78 protruding from the upper end 71 toward the lower end 72. The positioning protrusions 78, 78 are disposed on the first line L1.

Figure 6A:
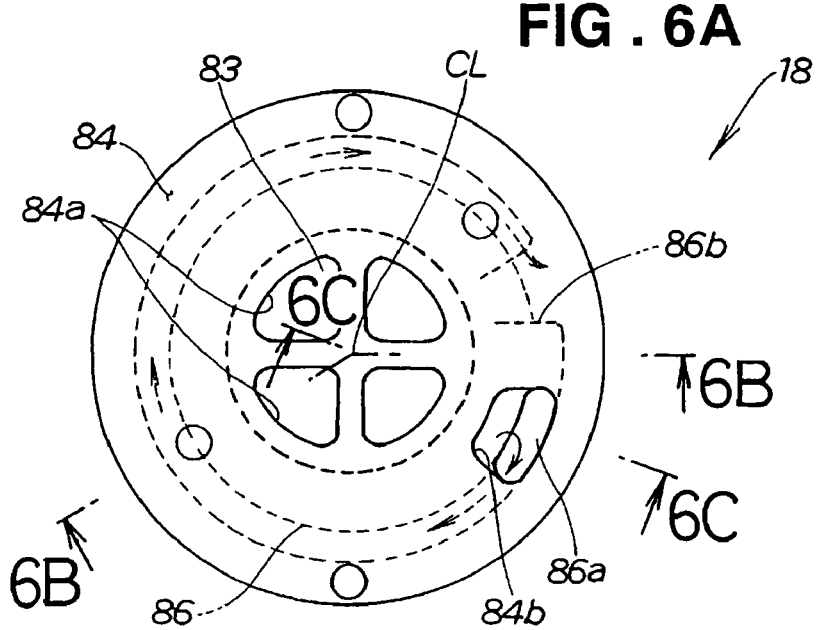
FIG. 6A to FIG. 6D illustrate details of the partition member shown in FIG. 4.
Figure 6B:
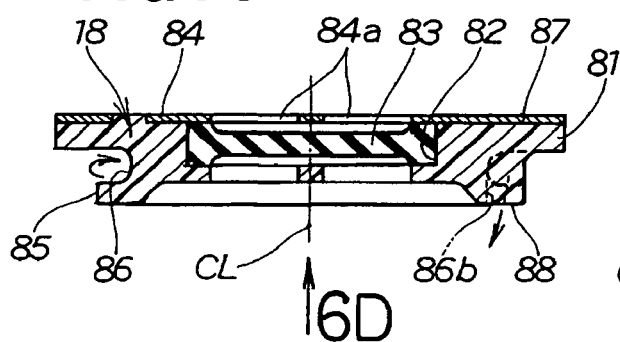
Figure 6C:
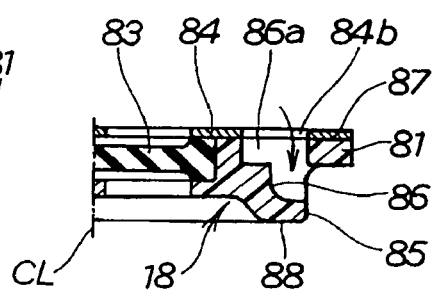
Figure 6D:
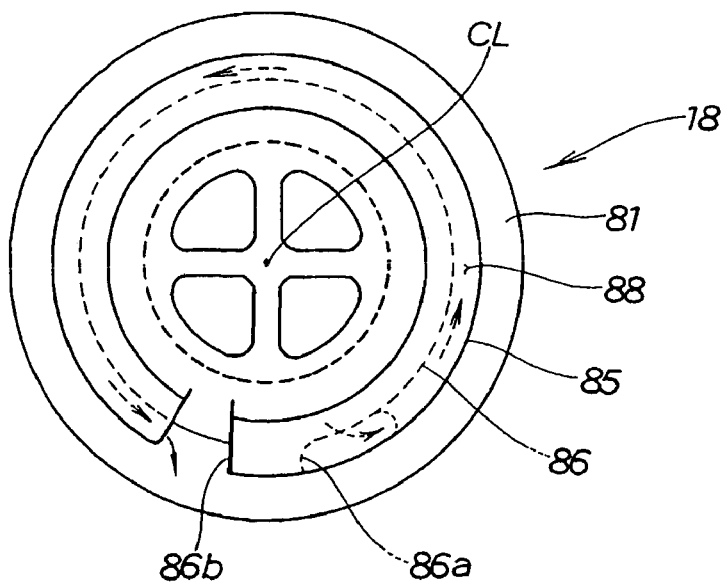

Reference is now made to FIG. 6A to FIG. 6D illustrating the partition member 18 shown in FIG. 4. More specifically, FIG. 6A is a top plan view of the partition member 18 while FIG. 6B is a cross-sectional view taken along line 6B-6B of FIG. 6A. FIG. 6C is a cross-sectional view taken along line 6C-6C of FIG. 6A while FIG. 6D is a view from the direction of arrow 6D of FIG. 6B.

Referring to FIG. 6A to FIG. 6D inclusive, the partition member 18 is molded from a resin material into a hollow disc shape and has a flange 81 projecting radially outwardly from an upper end thereof. The partition member 18 is comprised of a disc-shaped elastic partition plate 83 made of a rubber material and fitted in a hollow part 82 formed on the axis CL, and a cover plate 84 placed on the partition plate 83 and attached to the hollow part 82 by applying heat and caulking. The cover plate 84 comprises a thin metal sheet having a plurality of through holes 84a formed at a position facing the elastic partition plate 83.

The elastic partition plate 83 is opposed to the main fluid chamber 16 and the sub fluid chamber 17 as shown in FIG. 3. Elastic displacement of the elastic partition plate 83 can absorb a change in internal pressure of the main fluid chamber 16 or sub fluid chamber 17, thereby improving a dynamic characteristic with respect to vibrations in a medium frequency range.

The partition member 18 has an outer peripheral groove 86 formed in an outer peripheral surface 85 thereof. One end 86a of the outer peripheral groove 86 communicates with a through hole 84b of the cover plate 84 via an upper end 87 of the partition member 18. The opposite or other end 86b of the outer peripheral groove 86 reaches a lower end 88 of the partition member 18. As can be appreciated from FIG. 6A, the outer peripheral groove 86 runs 315° clockwise from the one end 86a and terminates in the other end 86b.

For mounting it, the partition member 18 is placed within the metal tubular member 20 and press-fitted into the covering film part 14a lined internally of the second cylindrical part 23, followed by placing the flange 81 on the annular plate 22, as shown in FIG. 4. The partition member 18 is mounted to the metal tubular member 20 as shown in FIG. 3.

Press-fitting the partition member 18 into the covering film part 14a causes the outer peripheral surface of the partition member 18 to bite slightly into the covering film part 14a. As a result, the partition member 18 is secured while maintaining required fluid tightness. A communication passage 89 (see FIG. 2) is thus provided by the covering film part 14a and the outer peripheral groove 86. The main fluid chamber 16 is defined by the partition member 18 and the lower hollow part 73 of the elastic member 13.

The communication passage 89 functions as an orifice which provides communication between the main fluid chamber 16 and the sub fluid chamber 17. The communication passage 89 will hereinafter be referred to as a "first orifice 89".

Figure 7A:
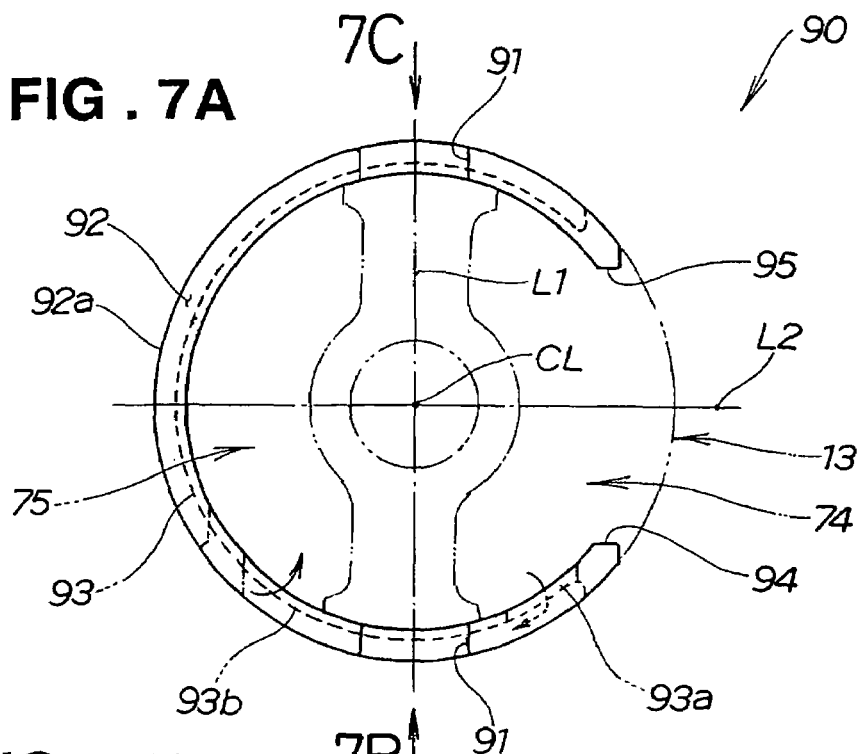
FIG. 7A to FIG. 7C illustrate details of a side partition member shown in FIG. 4.
Figure 7B:
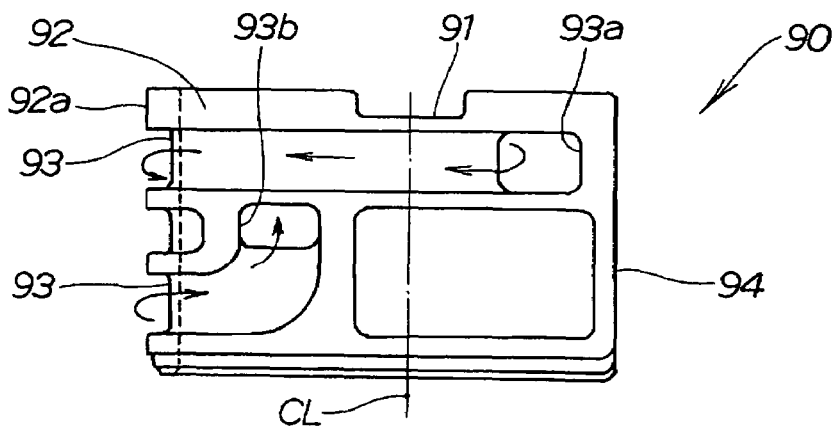
Figure 7C:
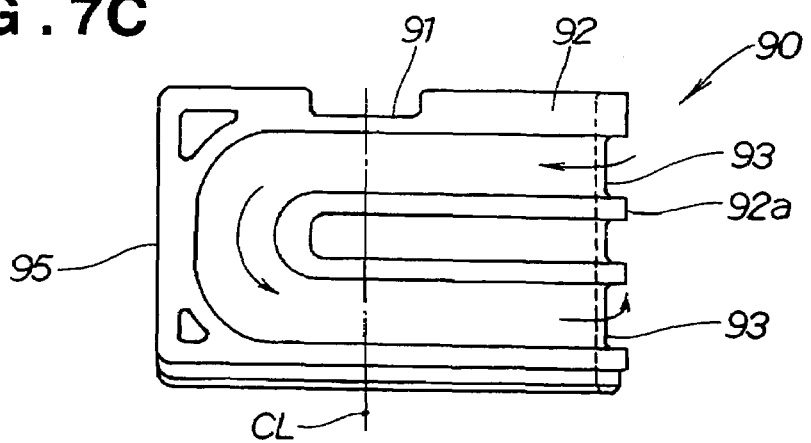

Reference is now made to FIG. 7A to FIG. 7C illustrating the side partition member 90. More specifically, FIG. 7A is a top plan view of the side partition member 90 while FIG. 7B is a view as seen from the direction of arrow 7B of FIG. 7A. FIG. 7C is a view as seen from the direction of arrow 7C of FIG. 7A.

As seen from FIG. 7A, the side partition member 90 is formed from a resin material and has a substantially C shape as viewed in top plan. As shown in FIG. 5B, FIG. 5C and FIG. 7A, the side partition member 90 is fit-mounted to the lower end 72 of the elastic member 13 in a fluid-tight fashion and has on an upper end thereof a pair of positioning recesses 91, 91. These positioning recesses 91, 19 are disposed on the first line L1. By fitting the positioning recesses 91, 91 shown in FIG. 7A to FIG. 7C with the positioning protrusions 78, 78 shown in FIG. 5C and FIG. 5D, the side partition member 90 is circumferentially positioned with respect to the elastic member 13.

On an outer peripheral surface 92a of a side wall 92 having a generally C shape in top plan, the side partition member 90 has a labyrinth-shaped groove 93. One end 93a of the labyrinth-shaped groove 93, positioned closely to one notched end 94 of the C shape, is formed as a through hole passing through an upper part of the side wall 92. The other end 93b of the labyrinth-shaped groove 93 is formed as a through hole passing through that part of the side wall 92 which is positioned obliquely downwardly of the one end 93a, as shown in FIG. 7B.

As viewed in top plan, the labyrinth-shaped groove 93 runs clockwise from the one end 93a along the outer peripheral surface 92a of the side wall 92 and descends at a position proximate to the other notched end 95. Then, the groove 93 runs counter-clockwise toward the initial one notched end 94 after it slightly ascended midway. Finally, it connects and communicates with the other end 93b. As shown in FIG. 7A, the one end 93a of the labyrinth-shaped groove 93 communicates with a first side hollow part 74 while the other end 93b communicates with a second hollow part 75. The notched ends 94, 95 are opposed to one side of line L2 and hence face the first side hollow part 74.

Discussion will be made next as to a mode of mounting of the elastic member 13 and the side partition member 90 to the metal tubular member 20.

As shown in FIG. 4, the elastic member 13 and the side partition member 90 are first assembled by press-fitting the elastic member 13 into the side partition member 90. Then, the elastic member 13 and the side partition member 90 are engaged in the metal tubular member 20, whereupon they are press-fitted within the covering film part 14a covering the inner peripheral surface of the second tubular part 23 until their lower ends abut against the annular plate part 22. The elastic member 13 and the side partition member 90 are assembled with the metal tubular member 20 in this manner into a state as shown in FIG. 3.

Press-fitting the side partition member 90 in the covering film member 14a results in the outer peripheral surface 92a of the side partition member 90 slightly biting into the covering film member 14a, thereby securely fixing the side partition member 90 while providing fluid tightness between it and the film member 14a. As a result, a communication passage 96 (see FIG. 3) is defined by the covering film member 14a and the labyrinth-shaped groove 93.

A first side fluid chamber 101 is defined by the side partition member 90 and the first side hollow part 75 while a second fluid chamber 102 is defined by the side partition member 90 and the second side hollow part 75. A combination of the first side fluid chamber 101 and the second side fluid chamber 102 forms a second fluid chamber 103. The second fluid chamber 103 is a space for holding a working fluid Lq in a sealed fashion.

The labyrinth-shaped communication passage 96 functions as an orifice for establishing fluid communication between the first side fluid chamber 101 and the second side fluid chamber 102 shown in FIG. 3. The communication passage 96 will hereinafter be referred to as a "second orifice".

Discussion will be made next as to a vibration attenuation operation of the vibration-proof apparatus 10 arranged as explained above.

As shown in FIG. 2, when vibrations from the engine EG are applied axially (in the direction of the centerline CL) to the vibration-proof apparatus 10, the working fluid Lq flows through the first orifice 89 into the main fluid chamber 16 and then into the sub fluid chamber 17, causing the elastic member 13 to elastically deform to thereby attenuate the vibrations of the engine EG.

When vibrations of the engine EG, associated with a rolling action of a vehicle, are applied to the vibration-proof apparatus 10 from a direction normal to the centerline CL, the working fluid Lq flows through the second orifice 96 into the first and second side fluid chambers 101, 102, causing the elastic member 13 to elastically deform to thereby attenuate the vibrations.

The vehicle vibration-proof apparatus 10 is not limited to uses as a hydro engine mount and may be arranged such that it can be positioned between the vehicle body BD and the power source EG for supporting the power source and preventing vibrations.

Also, the first mounting member 11 may be arranged to be secured to either one of the power source EG and the vehicle body BD while the second mounting member 12 may be arranged to be secured to the other one of the power source EG and the vehicle body BD. The same is applied to the mounting parts 42, 42.

Further, the resinous bracket 40 may be arranged to allow embedding of not only the non-press-fitting part 32 but also the press-fitting part 31. In this instance, the rubber member 50 may be interposed between the outer peripheral surface of the press-fitting part 31 and the tubular part 41.

The vehicular vibration-proof apparatus according to the present invention is particularly useful when it is positioned between a front part of a front-wheel-drive vehicle and a front part of an engine for supporting the engine and preventing vibrations of the engine.

Obviously, various minor changes and modifications of the present embodiments of the invention are possible in the light of the above teachings. It is therefore to be understood that within the scope of the appended claims the invention may be practiced otherwise than as specifically described in relation to the present embodiments.

What is claimed is:

1. A vehicular vibration-proof apparatus comprising:
   a first mounting member adapted to be mounted to one of a power source and a vehicle body;
   a tubular-shaped second mounting member adapted to be mounted to the other of the power source and the vehicle body; and
   an elastic member connecting the first mounting member with the second mounting member,
   the second mounting member comprising a resinous bracket and a metal reinforcing member,
   the resinous bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket,
   the metal reinforcing member being oriented in an axial direction of the tubular part and mounted to the tubular part at a position displaced in the axial direction from the mounting parts, for reinforcing the tubular part, and
   wherein the metal reinforcing member reinforces only an upper portion of the tubular part of the resinous bracket, and an intermediate portion of the tubular part disposed below the metal reinforcing member and above the mounting parts is a non-reinforced part which is easily deformed when a load larger than a predetermined magnitude is applied to the vibration-proof apparatus in a direction normal to the centerline thereof.

2. The vibration-proof apparatus of claim 1, wherein the metal reinforcing member has an end mounted to the upper portion of the tubular part which is remote from the mounting parts, for reinforcing that part of the tubular part to which the end of the metal reinforcing member is mounted.

3. The vibration-proof apparatus of claim 1, wherein the second mounting member further includes metal collars disposed with said mounting parts and extending in a direction parallel to the axis of the tubular part.

4. The vibration-proof apparatus of claim 3, wherein the metal collars include brim parts extending substantially parallel to a lower surface of the mounting part toward a centerline of the vibration-proof apparatus.

5. The vibration-proof apparatus of claim 4, wherein a portion of the tubular part extending between the brim parts and the metal reinforcing member is non-reinforced part which is easily deformed when a load larger than a predetermined magnitude is applied to the vibration-proof apparatus in a direction normal to the centerline thereof 6. The vibration-proof apparatus of claim 4, wherein the brim parts extend toward the centerline within the tubular part a distance equal to approximately half of a width of the tubular part.

7. The vibration-proof apparatus of claim 1, wherein the portion of the reinforcing member extending within the resinous bracket is rubber-coated.

8. A vehicular vibration-proof apparatus comprising:
a first mounting member adapted to be mounted to one of a power source and a vehicle body;
a tubular-shaped second mounting member adapted to be mounted to the other of the power source and the vehicle body; and
an elastic member connecting the first mounting member with the second mounting member,
the second mounting member comprising a bracket formed of resinous material and a metal reinforcing member,
the bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket,
the metal reinforcing member being oriented in an axial direction of the tubular part and mounted to a portion of the tubular part displaced in the axial direction from the mounting parts, such that said portion of the tubular part is reinforced and another portion of the tubular part between said reinforced part and said mounting parts is non-reinforced, and
wherein the metal reinforcing member reinforces only an upper portion of the tubular part of the resinous bracket, and an intermediate portion of the tubular part disposed below the metal reinforcing member and above the mounting parts is the non-reinforced part and is easily deformed when a load larger than a predetermined magnitude is applied to the vibration-proof apparatus in a direction normal to the centerline thereof.

9. The vibration-proof apparatus of claim 8, wherein the metal reinforcing member has an end mounted to the upper portion of the tubular part which is remote from the mounting parts.

10. The vibration-proof apparatus of claim 8, wherein the second mounting member further includes metal collars disposed with said mounting parts and extending in a direction parallel to the axis of the tubular part.

11. The vibration-proof apparatus of claim 10, wherein the metal collars include brim parts extending substantially parallel to a lower surface of the mounting part toward a centerline of the vibration-proof apparatus.

12. The vibration-proof apparatus of claim 11, wherein said non-reinforced portion of the tubular part extends between the brim parts and the metal reinforcing member and is easily deformed when the load larger than a predetermined magnitude is applied to the vibration-proof apparatus in a direction normal to the centerline thereof.

13. The vibration-proof apparatus of claim 11, wherein the brim parts extend toward the centerline within the tubular part a distance equal to approximately half of a width of the tubular part.

14. The vibration-proof apparatus of claim 8, wherein the portion of the reinforcing member extending within the resinous bracket is rubber-coated.

15. A vehicular vibration-proof apparatus comprising:
a first mounting member adapted to be mounted to one of a power source and a vehicle body;
a tubular-shaped second mounting member adapted to be mounted to the other of the power source and the vehicle body; and
an elastic member connecting the first mounting member with the second mounting member,
the second mounting member comprising a resinous bracket and a metal reinforcing member,
the resinous bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket, the metal reinforcing member being oriented in an axial direction of the tubular part and mounted to the tubular part at a position displaced in the axial direction from the mounting parts, for reinforcing the tubular part,
wherein the second mounting member further comprises a metal tubular member connected to the metal reinforcing member, the elastic member is mounted in the metal tubular member, and the resinous bracket surrounds a lower portion of the tubular member in spaced relation thereto with an open gap therebetween.

16. The vibration-proof apparatus of claim 15, wherein an upper portion of the metal reinforcing member is connected to the metal tubular member and a lower portion of the metal reinforcing member extends away from the metal tubular member and within an upper portion of the resinous bracket.

17. A vehicular vibration-proof apparatus comprising:
a first mounting member adapted to be mounted to one of a power source and a vehicle bodm
a tubular-shaped second mounting member adapted to be mounted to the other of the power source and the vehicle body; and
an elastic member connecting the first mounting member with the second mounting member,
the second mounting member comprising a resinous bracket and a metal reinforcing member,
the resinous bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket,
the metal reinforcing member being oriented in an axial direction of the tubular part and mounted to the tubular part at a position displaced in the axial direction from the mounting parts, for reinforcing the tubular part, and wherein the reinforcing member includes a projection at a lower end thereof extending radially outwardly and embedded in an upper portion of the resinous bracket, wherein the metal reinforcing member reinforces only an upper portion of the tubular part of the resinous bracket, and an intermediate portion of the tubular part disposed below the metal reinforcing member and above the mounting parts is a non-reinforced part which is easily deformed when a load larger than a predetermined magnitude is applied to the vibration-proof apparatus in a direction normal to the centerline thereof.

18. A vehicular vibration-proof apparatus comprising:
a first mounting member adapted to be mounted to one of a power source and a vehicle body;
a tubular-shaped second mounting member adapted to be mounted to the other of the power source and the vehicle body; and an elastic member connecting the first mounting member with the second mounting member, the second mounting member comprising a bracket formed of resinous material and a metal reinforcing member, the bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket, the metal reinforcing member being oriented in an axial direction of the tubular part and mounted to a portion of the tubular part displaced in the axial direction from the mounting parts, such that said portion of the tubular part is reinforced and another portion of the tubular part between said reinforced part and said mounting parts is non-reinforced, wherein the second mounting member farther comprises a metal tubular member connected to the metal reinforcing member, the elastic member is mounted in the metal tubular member, and the resinous bracket surrounds a lower portion of the tubular member in spaced relation thereto with an open gap therebetween.

19. The vibration-proof apparatus of claim 18, wherein an upper portion of the metal reinforcing member is connected to the metal tubular member and a lower portion of the metal reinforcing member extends away from the metal tubular member and within an upper portion of the resinous bracket.

20. A vehicular vibration-proof apparatus comprising:

a first mounting member adapted to be mounted to one of a power source and a vehicle body;

a tubular-shaped second mounting member adapted to be mounted to the other of the power source and the vehicle body; and an elastic member connecting the first mounting member with the second mounting member, the second mounting member comprising a bracket formed of resinous material and a metal reinforcing member, the bracket having a tubular part which surrounds the elastic member, and mounting parts extending from the tubular part outwardly in a direction normal to an axis of the tubular part and adapted to be mounted to the other of the power source and the vehicle body, the tubular part and the mounting parts being formed integrally with the resinous bracket, the metal reinforcing member being oriented in an axial direction of the tubular part and mounted to a portion of the tubular part displaced in the axial direction from the mounting parts, such that said portion of the tubular part is reinforced and another portion of the tubular part between said reinforced part and said mounting parts is non-reinforced, and wherein the reinforcing member includes a projection at a lower end thereof extending radially outwardly and embedded in an upper portion of the resinous bracket.

* * * * *